UNITED STATES PATENT OFFICE.

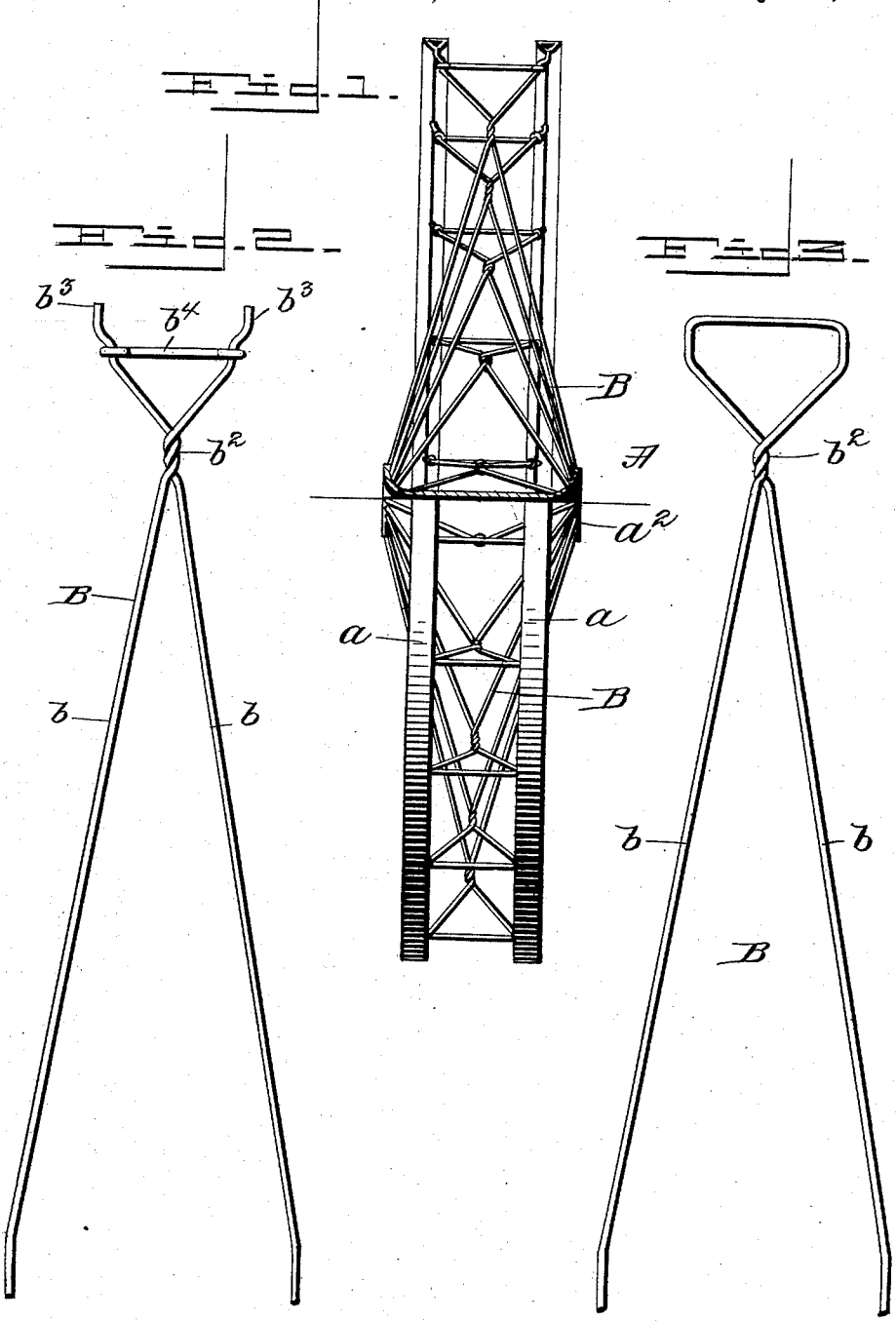

GODFRIED LAUBE, OF HURON, SOUTH DAKOTA, ASSIGNOR OF ONE-HALF TO JOSEPH HYMANS, OF DEL RIO, TEXAS.

WHEEL.

SPECIFICATION forming part of Letters Patent No. 522,941, dated July 10, 1894.

Application filed October 23, 1893. Serial No. 488,890. (No model.)

*To all whom it may concern:*

Be it known that I, GODFRIED LAUBE, a citizen of the United States of America, residing at Huron, in the county of Beadle and State of South Dakota, have invented certain new and useful Improvements in Vehicle-Wheels, of which the following is a specification, reference being had to the accompanying drawings.

This invention relates to certain new and useful improvements in "vehicle wheels" and more especially to the construction of "metallic spokes" for bicycle or like wheels. This improved spoke is particularly adapted for use in broad or double tire wheels, such for example, as shown in my former application, filed July 3, 1893, and bearing Serial No. 479,472.

The object of the invention is to provide an inexpensive spoke of this class that shall possess advantages in point of simplicity, durability and efficiency.

With this and other objects in view, various novel features of construction and combinations are employed which will be hereinafter more fully set forth and specifically pointed out in the claims.

In describing the invention in detail, reference is had to the accompanying drawings forming part of this specification and wherein like letters indicate correspondings parts in the several views, in which—

Figure 1. is a central vertical sectional view of a wheel showing my improved spoke attached thereto. Fig. 2. is an enlarged detail view of the spoke detached. Fig. 3 is a modification.

In the drawings:—A, denotes a preferred form of an all metal wheel, the general construction of which is well known in the art and here employed for purposes of illustration only. This wheel is provided with double fellies $a$, $a$, and a hub $a^2$. Connecting the fellies and the hub is a series of spokes B, each of which consists of duplicate lengths of wire —$b$—$b$— having one extremity suitably secured to the hub with the main portions thereof projecting outwardly and converging and meeting at a point —$b^2$— adjacent the fellies where the said wires are united, either by twisting, soldering or in any other suitable manner. From this point of connection the outer extremities or free ends —$b^3$—$b^3$— diverge to meet the suitably spaced fellies to which they are secured in any well-known manner.

An important feature of this invention consists in providing the spoke adjacent the fellies with a metallic tie or strap —$b^4$— which latter engages suitably formed notches —$b^5$— $b^5$— and is thereby securely retained in proper position. This tie or brace $b^4$, tends to lessen the strain on the point of connection and at the same time adds greatly to the efficiency of the spoke.

Referring to Fig. 3, I have shown a slightly modified form of spoke in which the tie or strap —$b^4$— is dispensed with, that is to say, it is formed integral with the spoke by bending the latter midway of its length into an approximate V-shape and connecting the legs as above described.

Having fully described my invention, what I claim as new, and desire to obtain by Letters Patent, is—

1. In a wheel for vehicles, a spoke formed from duplicate lengths of wire with the lower extremities thereof secured to the hub and the main portions converging outwardly and connected adjacent the free extremities, said extremities diverging beyond the point of connection and suitably secured to the felly and a suitable tie connecting said diverging extremities, as specified.

2. A spoke provided adjacent the outer extremity with diverging branches which are adapted for attachment with the felly and a cross-tie connecting said branches adjacent the point of connection with the felly, as specified.

In testimony whereof I affix my signature in presence of two witnesses.

GODFRIED LAUBE.

Witnesses:
HATTIE R. LAUBE,
JOHN F. SHAUL.